United States Patent
Peng et al.

(10) Patent No.: US 9,837,070 B2
(45) Date of Patent: Dec. 5, 2017

(54) VERIFICATION OF MAPPINGS BETWEEN PHONEME SEQUENCES AND WORDS

(71) Applicant: Google Inc., Mountain View, CA (US)

(72) Inventors: Fuchun Peng, Cupertino, CA (US); Kanury Kanishka Rao, Sunnyvale, CA (US); Francoise Beaufays, Mountain View, CA (US)

(73) Assignee: Google Inc., Mountain View, CA (US)

( * ) Notice: Subject to any disclaimer, the term of this patent is extended or adjusted under 35 U.S.C. 154(b) by 413 days.

(21) Appl. No.: 14/186,400

(22) Filed: Feb. 21, 2014

(65) Prior Publication Data
US 2015/0161985 A1    Jun. 11, 2015

Related U.S. Application Data

(60) Provisional application No. 61/913,514, filed on Dec. 9, 2013.

(51) Int. Cl.
*G10L 15/06* (2013.01)
*G10L 15/26* (2006.01)

(52) U.S. Cl.
CPC .......... *G10L 15/063* (2013.01); *G10L 15/26* (2013.01)

(58) Field of Classification Search
None
See application file for complete search history.

(56) References Cited

U.S. PATENT DOCUMENTS

| | | | | |
|---|---|---|---|---|
| 6,078,885 A | * | 6/2000 | Beutnagel | G10L 15/063 704/231 |
| 7,266,495 B1 | * | 9/2007 | Beaufays | G10L 15/06 704/236 |
| 7,280,963 B1 | * | 10/2007 | Beaufays | G10L 15/187 704/236 |
| 7,337,116 B2 | | 2/2008 | Charlesworth | |
| 7,533,018 B2 | * | 5/2009 | Ma | G10L 15/063 704/243 |
| 8,515,753 B2 | | 8/2013 | Kim | |

(Continued)

FOREIGN PATENT DOCUMENTS

WO    WO9415330 A1    7/1994
WO    WO0036591 A1    6/2000

OTHER PUBLICATIONS

Mak et al., "PLASER: Pronunciation Learning via Automatic Speech Recognition," [online] [Retrieved on Feb. 21, 2014]; Retrieved from the Internet URL: http://acl.ldc.upenn.edu/W/W03/W03-0204.pdf; 7 pages.

*Primary Examiner* — Walter Yehl
(74) *Attorney, Agent, or Firm* — Fish & Richardson P.C.

(57) ABSTRACT

Methods, systems, and apparatus, including computer programs encoded on a computer storage medium, for verifying pronunciations. In one aspect, a method includes obtaining a first transcription for an utterance. A second transcription for the utterance is obtained. The second transcription is different from the first transcription. One or more feature scores are determined based on the first transcription and the second transcription. The one or more feature scores are input to a trained classifier. An output of the classifier is received. The output indicates which of the first transcription and the second transcription is more likely to be a correct transcription of the utterance.

22 Claims, 5 Drawing Sheets

(56) References Cited

U.S. PATENT DOCUMENTS

| | | | |
|---|---|---|---|
| 8,959,020 B1* | 2/2015 | Strope | G10L 15/187 704/257 |
| 2002/0095290 A1* | 7/2002 | Kahn | G10L 15/063 704/260 |
| 2003/0004724 A1* | 1/2003 | Kahn | G10L 15/063 704/260 |
| 2004/0034527 A1* | 2/2004 | Hennecke | G10L 15/32 704/231 |
| 2006/0143008 A1* | 6/2006 | Schneider | G10L 15/063 704/251 |
| 2013/0006623 A1* | 1/2013 | Chelba | G10L 15/187 704/233 |
| 2015/0012271 A1* | 1/2015 | Peng | G10L 15/08 704/235 |

* cited by examiner

VERIFICATION OF MAPPINGS BETWEEN PHONEME SEQUENCES AND WORDS

CROSS REFERENCE TO RELATED APPLICATION

This application claims the benefit under 35 U.S.C. §119 (e) of U.S. Provisional Patent Application No. 61/913,514 filed on Dec. 9, 2013, entitled "PRONUNCIATION VERIFICATION," the entire content of which is hereby incorporated by reference.

TECHNICAL FIELD

This specification generally relates to speech recognition systems.

BACKGROUND

Some speech recognition systems use a pronunciation dictionary or other pronunciation information to recognize speech. Often, a pronunciation dictionary is constructed manually by linguistic experts, which can be time consuming and costly.

SUMMARY

In general, one aspect of the subject matter includes the actions of obtaining a first transcription for an utterance; obtaining a second transcription for the utterance, wherein the second transcription is different from the first transcription; determining one or more feature scores based on the first transcription and the second transcription; inputting the one or more feature scores to a trained classifier; and receiving an output of the classifier that indicates which of the first transcription and the second transcription is more likely to be a correct transcription of the utterance. Other embodiments of this aspect include corresponding systems, apparatus, and computer programs, configured to perform the actions of the methods, encoded on computer storage devices.

These and other embodiments can each optionally include one or more of the following features. Obtaining the first transcription for the utterance can include using a first set of mappings between phoneme sequences and words to determine the first transcription. Obtaining the second transcription can include using a second set of mappings between phoneme sequences and words to generate the second transcription. The second set of mappings can be different from the first set of mappings.

Differences between the first transcription and the second transcription can be entirely due to differences between the first mapping and the second mapping. Aspects can further include identifying a mapping in the second set of mappings that causes the second transcription to be different from the first transcription.

Identifying the mapping can include determining an alignment of the second transcription with respect to the first transcription; based on the alignment, identifying a word in the second transcription that is different from a corresponding word in the first transcription; and identifying, from the second set of mappings, a mapping that was used to select the word in the second transcription that is different from a corresponding word in the first transcription.

Aspects can further include obtaining classifier outputs for each of multiple transcription pairs, wherein each of the multiple transcription pairs include two different transcriptions, and a same mapping from the second set of mappings causes a difference between the two different transcriptions of each transcription pair; aggregating the classifier outputs to generate an aggregate score; comparing the aggregate score to a threshold; and based on comparing the aggregate score to the threshold, determining whether the particular mapping represents a valid pronunciation.

Aspects can further include identifying a particular mapping between a phoneme sequence and one or more words; and identifying, in a set of utterances, a subset comprising one or more utterances that include a phone sequence that matches at least a portion of the phoneme sequence of the mapping. The utterance may be a member of the subset. In some aspects, obtaining the first transcription, obtaining the second transcription, determining one or more feature scores, inputting the one or more feature scores, and receiving the output may be performed in response to determining that the utterance includes a phone sequence that corresponds to at least a portion of the phoneme sequence of the mapping.

Determining one or more feature scores based on the first transcription and the second transcription can include determining a language model score for at least one of the first transcription and the second transcription.

Determining one or more feature scores based on the first transcription and the second transcription can include obtaining a first sequence of phones that represents the first transcription; obtaining a second sequence of phones that represents the second transcription; and identifying, as a phonetic edit distance, a number of phones in the second sequence of phones that are different from the first sequence of phones.

Determining one or more feature scores based on the first transcription and the second transcription can include obtaining data specifying whether the second transcription has been provided as a suggested query in response to receiving a query that matches the first transcription.

Determining one or more feature scores based on the first transcription and the second transcription can include determining an acoustic model score for at least one of the first transcription and the second transcription. The acoustic model score for a transcription can specify a level of match between an audio waveform that represents the transcription and an audio waveform that represents the utterance.

Determining one or more feature scores based on the first transcription and the second transcription can include identifying a mapping between a phoneme sequence and words that resulted in a selection of a word in the second transcription that is different from a word of the first transcription; and determining whether the phoneme sequence of the identified mapping matches a phoneme sequence for a second mapping that maps the phoneme sequence to a second word that is different from the word in the second transcription. Determining one or more feature scores based on the first transcription and the second transcription can include determining a score that indicates a similarity between a sequence of phones for the second transcription and a sequence of phones for the first transcription.

Determining one or more feature scores based on the first transcription and the second transcription can include determining a speech recognizer confidence measure for at least one of the first transcription and the second transcription.

Determining one or more feature scores based on the first transcription and the second transcription can include determining a length of a word of the second transcription that is different from a corresponding word of the first transcription.

Determining one or more feature scores based on the first transcription and the second transcription can include determining a position within the second transcription of a phone that differs from a phone of the first transcription.

Determining one or more feature scores based on the first transcription and the second transcription can include determining a phoneme sequence language model score for at least one of the first transcription and the second transcription.

Determining one or more feature scores based on the first transcription and the second transcription can include determining whether at least one of the first transcription and the second transcription has been used in a query correction service to correct a misspelled query.

Determining one or more feature scores based on the first transcription and the second transcription can include determining whether at least one of the first transcription and the second transcription has been provided as a suggested query in response to receipt of another query.

Determining one or more feature scores based on the first transcription and the second transcription can include determining a relative frequency at which one or more users have spoken at least a portion of the first transcription. Determining one or more feature scores based on the first transcription and the second transcription can include determining a relative frequency at which one or more users have typed at least a portion of the first transcription.

Determining one or more feature scores based on the first transcription and the second transcription can include identifying an n-gram of the second transcription that includes a word that differs from a corresponding word of the first transcription; identifying an n-gram of the first transcription that corresponds to the n-gram of the second transcription and includes the corresponding word of the first transcription; and determining a ratio between the number of occurrences of the n-gram of the second transcription and the number of occurrences of the n-gram of the first transcription.

Determining one or more feature scores based on the first transcription and the second transcription can include determining a measure of frame alignment between one or more words of the first transcription and an audio waveform of the utterance. Determining one or more feature scores based on the first transcription and the second transcription can include determining a measure of frame alignment between one or more words of the second transcription and an audio waveform of the utterance.

In some aspects, the classifier includes a maximum entropy classifier. In some aspects, the classifier includes a boost decision tree classifier. In some aspects, the classifier includes a support vector machine classifier.

The details of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
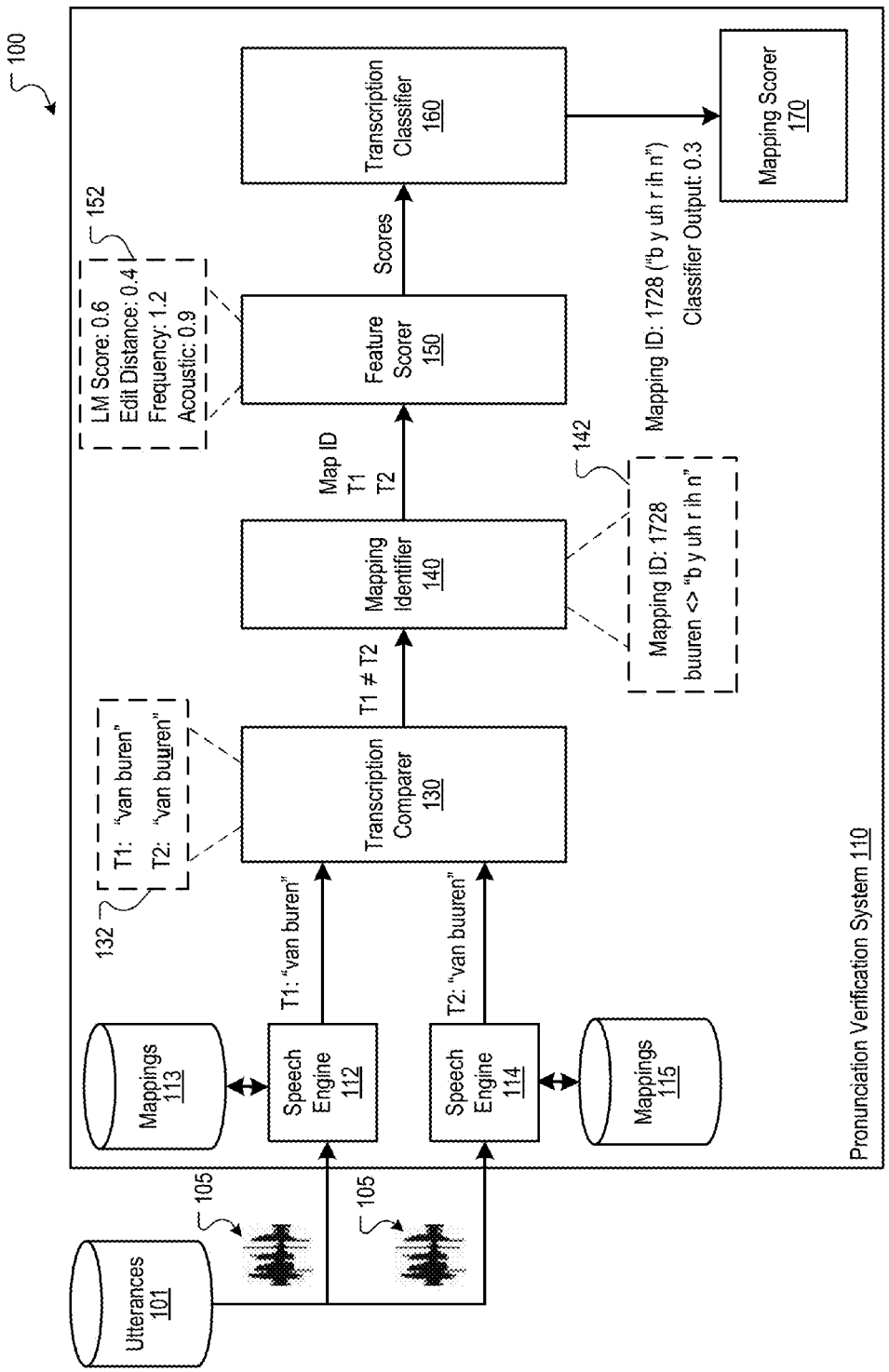
FIG. 1 is a diagram of an example environment showing an example of a pronunciation verification system.

A pronunciation verification system can validate candidate mappings between phoneme sequences and words. A mapping between a phoneme sequence and a word, which is also referred to as a pronunciation, can be used to convert an utterance, such as a user's voice input, to text. For example, the mappings may be used as part of a speech recognition system. When an utterance is received, the speech recognition system can transcribe the utterance to a phoneme sequence. The speech recognition system can then use the mappings to select word(s) that correspond to the phoneme sequence.

As used herein, a phoneme represents a unit of language. For example, different phonemes represent different phonetic components of words. A phone represents a specific instance of a phoneme in an utterance. For example, a phone can be a label that indicates which phoneme describes a particular sound in a particular utterance.

In some implementations, a machine learning framework is used to verify mappings between words and phoneme sequences for use in speech recognition. For each mapping of a word to a phoneme sequence, the phoneme sequence represents a manner of pronouncing the corresponding word. Thus, each mapping can be considered a pronunciation record that represents a particular pronunciation for a word. The system can validate candidate mappings by comparing transcriptions of utterances generated using the candidate mappings with transcriptions of the utterances generated using baseline mappings. When the mappings result in different transcriptions for a same utterance, a classifier (e.g., a boosted decision tree classifier, maximum entropy classifier, or a support vector machine classifier) can use feature scores for features related to the transcriptions and/or the utterance to determine an output that indicates whether the transcription generated using the candidate mapping is more likely to be correct than the transcription generated using the baseline mapping. In some implementations, the classifier can combine signals including text features, acoustic features, and web search features.

For each candidate mapping, the system can determine an aggregate quality score for the mapping using classifier outputs associated with the mapping and determine whether the mapping is valid based on the quality score. Mappings selected based on such a quality score can significantly improve speech recognition results.

The quality of mappings between phoneme sequences and words may affect the accuracy of a speech recognition system. Techniques for generating mappings include grapheme-to-phoneme conversion and data-driven learning from audio data. However, the mappings that these techniques generate are not all accurate. For example, there are many incorrect mappings learned from audio, for reasons such as lack of audio examples, bad acoustic signals, or bad candidates. In some instances, a learning system may incorrectly interpret phonemes at word boundaries, leading to an incorrect mapping learned from audio. For example, the word "text" is sometimes pronounced as "t ey k s" rather than "t ey k s t" because "t" sound is skipped in many utterances such as "text john I will be home." Identifying and removing incorrect mappings may improve the speech recognition quality.

A machine learning based verification system can be used to improve speech recognition. The system may be used to verify the accuracy of new mapping data, for example, to determine whether certain changes to a pronunciation dictionary (e.g., dictionary of mappings between phoneme sequences and words) would improve the accuracy of a speech recognition system. In some implementations, the system may have fast turnaround (e.g., produce verification results quickly) and may be used to verify pronunciations for multiple languages. To provide accurate mapping verification, the system can make decisions based on multiple orthogonal features to validate the mapping from linguistic aspects, from acoustic aspects, and/or from user behaviors.

In some implementations, a pronunciation verification system can perform several operations to evaluate mappings. In the example discussed below, candidate mappings for words can be evaluated relative to a baseline set of mappings for words.

The system can identify utterances that include sequences of sounds that correspond to the proposed mappings. To identify these utterances, two speech engines can be configured: a baseline engine that uses a baseline set of mappings, and an experimental engine that uses an experimental set of mappings. The experimental set of mappings can include one or more proposed mappings that are different from the baseline set. A set of utterances (e.g., recorded speech from users) can be input to the two speech engines to generate a speech recognition result (e.g., a transcription) from both of the engines for each of the utterances in the set. Each utterance that produces a different speech recognition result from the two engines can be selected and designated as an "affected utterance."

The system can also identify the particular mappings in the experimental set that caused the output from the experimental engine to be different from the output of the baseline engine. For each affected utterance, the system identifies which of the proposed mappings are responsible for the difference between the outputs of the two engines, and associates the identified mappings with the affected utterance.

To determine which mappings are associated with the change in recognition results from two speech engines, the two transcripts can be aligned to detect changed words. For example, consider the following two transcriptions, t1 and t2, for an utterance:

t1: "play armin van buren music"
t2: "play armin van buuren music"

In this example, the alignment indicates that the word "buren" in transcription t1 is changed to "buuren" in transcription t2.

A speech recognizer can generate a phone alignment for recognition results. Pronunciation of each word can be extracted from the phone alignment. A list of proposed pronunciations may include a pronunciation p1 "buuren: b y uh r ih n." This pronunciation p1 indicates that the word "buuren" represents the sequence of phones "b y uh r ih n." For the utterance that produced the transcriptions t1 and t2, the difference between transcriptions t1 and t2 can be attributed to the pronunciation p1.

Classifier outputs can be generated for the affected utterances. For each affected utterance, a trained classifier, e.g., a machine learning classifier, can provide an output that indicates which one of the two transcriptions is better.

An aggregate quality score (e.g., an aggregate score) can be computed for each of the proposed mappings. As discussed further below, the aggregate quality score for a proposed mapping can be determined using the classifier outputs for multiple affected utterances that are associated with the proposed mapping. One technique for calculating the quality score for a proposed mapping is to average the classifier outputs for all of the utterances that have differing transcriptions due to the proposed mapping.

In some implementations, a process may be used to determine whether or not a pronunciation is valid or acceptable. A side-by-side test may be run to identify utterances that have different transcriptions produced when using different sets of pronunciation mappings. A classifier may be used to determine if one of the transcriptions is better than the other. Then, it can be determined which pronunciation mapping is responsible for the difference in the two transcriptions. The classification scores for each of the utterances affected by the pronunciation mapping may be aggregated. A determination may be made whether the pronunciation mapping is acceptable, or likely to be correct, based on the aggregated score and a threshold.

FIG. 1 is a diagram of an example environment 100 showing a pronunciation verification system 110. In the example, the system 110 identifies valid mappings between phoneme sequences and words. These mappings are also referred to herein as pronunciations. An example mapping may map the phoneme sequence "t ey k s t" to the word "text." A mapping between phoneme sequences and words can be used to transcribe audio data, e.g., audio data received from a user. To validate (or verify the accuracy of) mappings, such as untested candidate mappings, the pronunciation verification system 110 can compare transcriptions of utterances determined using the mapping with transcriptions of the utterances determined using a baseline mapping.

The pronunciation verification system 110 includes speech engines 112 and 114. Although two speech engines 112 and 114 are illustrated in FIG. 1, the pronunciation verification system 110 can include other numbers of speech engines. Each speech engine 112 and 114 uses a set of mappings between phone sequences and words to transcribe utterances. In particular, the speech engine 112 uses a set of mappings 113 to transcribe utterances and the speech engine 114 uses a set of mappings 115 to transcribe utterances. The set of mappings 113 can be different from the set of mappings 115. In some implementations, the mappings 113 include baseline mappings that have been previously tested or validated. The mappings 115 may include some or all of the baseline mappings and also include candidate mappings that are to be validated by the pronunciation verification system 110.

The speech engines 112 and 114 can receive utterances from an utterances repository 101. The utterances stored in the utterances repository 101 can be obtained from one or more sources. In some implementations, the utterances may include voice queries received by a search system. The pronunciation verification system 110 does not require the actual transcription of the utterances to be known in order to use the utterances in evaluating pronunciations. Accordingly, the pronunciation verification system 110 may use utterances for which the actual transcription is unknown.

Each speech engine 112 and 114 can use its respective mappings to transcribe the utterances. To transcribe an utterance, each speech engine 112 and 114 can convert the utterance into a sequence of phonemes. In some implementations, the speech engine 112 uses a similar (or the same) speech-to-phoneme converter as the speech engine 114. The speech engines 112 and 114 can use the speech-to-phoneme converter to convert an input utterance to a sequence of phonemes.

Each speech engine 112 and 114 can use its respective set of mappings to convert a sequence of phonemes to one or more words. For example, the speech engine 112 can use the set of mappings 113 to select one or more words based on the sequence of phonemes. Similarly, the speech engine 114 can use the set of mappings 115 to select one or more words based on the sequence of phonemes.

As shown in FIG. 1, the speech engine 112 has transcribed an utterance 105 to the transcription T1 using the set of mappings 113. The transcription T1 includes the text "van buren." Similarly, the speech engine 114 has transcribed the same utterance 105 to the transcription T2 using the set of mappings 115. The speech engines 112 and 114 can provide their respective transcriptions T1 and T2 for the utterance 105 to a transcription comparer 130.

The transcription comparer 130 can compare transcriptions for a particular utterance to determine whether the transcriptions match each other. In the example of FIG. 1, the transcription comparer 130 compares the transcription T1 to the transcription T2 to determine whether the transcriptions are identical. In some implementations, the transcription comparer 130 aligns the two transcriptions to identify any words in the transcription T2 that differ from the transcription T1. For example, as shown in box 132, the transcription comparer 130 has aligned the transcriptions T1 and T2, and the transcription comparer 130 has identified that the word "buuren" of transcription T2 is different from the corresponding word "buren" of transcription T1.

In response to determining that transcriptions for a particular utterance do not match each other, the transcription comparer 130 can provide data to a mapping identifier 140. This data can indicate that the two transcriptions do not match. The data can also specify the word(s) of the transcriptions that differ. For example, the transcription comparer 130 can provide data to the mapping identifier 140 that specifies that transcription T1 does not match T2 and that the word "buuren" of transcription T2 does not match the word "buren" of transcription T1. If the transcription comparer 130 determines that the transcriptions match each other, the transcription comparer 130 may store data indicating the match without providing data to the mapping identifier 140.

The mapping identifier 140 can identify the mapping from the set of mappings 115 that was used to select each word in the transcription T2 that is different from the corresponding word in the transcription T1. In the illustrated example, the mapping identifier 140 determines which mapping in the set of mappings 115 was used to select the word "buuren." As shown in box 142, this mapping has a mapping identifier (ID) of 1728 and represents a mapping between the phoneme sequence "b y uh r ih n" and the word "buuren."

In some implementations, the speech engines 112 and 114 provide to the transcription comparer 130, e.g., along with the transcriptions T1 and T2, data identifying the mappings that were used to transcribe each word of transcription T2 that is different from the corresponding word in transcription T1. This data may include, for each word of a transcription, data identifying a mapping ID for a mapping that was used to select the word. For example, the data may include, for the word "buuren," data indicating that the mapping associated with mapping ID 1728 was used by the speech engine 114 to select the word "buuren."

This data may also be provided to the mapping identifier 140 for use in identifying the mapping(s) that were used to select any words that differ between the two transcriptions T1 and T2. For example, the mapping identifier 140 may identify the mapping ID (e.g., "1728") associated with a word of the transcription T2 (e.g., "buuren") that differs from a word of the transcription T1 (e.g., "buren").

The pronunciation verification system 110 also includes a feature scorer 150 that can generate various feature scores for features of each utterance for which the transcriptions from the speech engines 112 and 114 differ. For example, the feature scorer 150 can generate feature scores for the utterance 105 using the transcriptions T1 and T2 and, for some features, an audio waveform that is representative of the utterance. The feature scorer 150 may generate a feature score for each of a predetermined set of features or attributes. In some implementations, the feature scores may include one or more of language model scores, acoustic model scores, speech recognizer confidence score(s), a phonetic edit distance score, a measure of the relative frequency that users have spoken or typed one or more portions of the transcription(s), n-gram frequencies, and/or other values.

An example feature score that can be generated for the transcriptions T and T2 is a language model score. The feature scorer 150 can apply a language model to each transcription T1 and T2 of the pair of transcriptions to determine a language model score for each transcription. The language model score for a particular transcription may indicate how likely it is that the transcription would be found in a particular language (e.g., how likely it is that the sequence of words in the transcription would occur in the English language). This feature can serve as an independent check on pronunciation learning as language modeling may not be used in some implementations of pronunciation learning. The language model score(s) and/or a difference between the language model scores for the two transcriptions T1 and T2 can be included in a set of feature scores for the pair of transcriptions T1 and T2.

The feature scorer 150 can determine an acoustic model score for each transcription T1 and T2 using the utterance 105. The acoustic model score for a particular transcription may be based on the particular transcription and the utterance 105. For example, the acoustic model score for the particular transcription may be based on a level of match between an audio waveform that represents the particular transcription and an audio waveform that represents the utterance. In some implementations, the transcription and its corresponding waveform can be force aligned and the acoustic model score for the transcription can be determined based on the level of match between the transcription and the waveform. The acoustic model score(s) and/or a difference between the acoustic model scores for the two transcriptions T1 and T2 can be included in the set of feature scores for the pair of transcriptions T1 and T2.

The feature scorer 150 can determine a measure of frame alignment for the first transcription T1 and/or a measure of frame alignment for the second transcription T2. A measure of frame alignment can be based on how well one or more words of a transcription align with an audio waveform that is representative of the utterance. For example, when a transcription is generated, data can be generated that identifies the portion of the utterance's audio waveform that was used to generate each word of the transcription. A measure of confidence can also be determined for each word and its corresponding portion of the waveform. This measure of confidence can be indicative of the confidence that the word corresponds to its corresponding portion of the waveform and can be based on a similarity of the waveform portion to a baseline waveform for the word. If a particular word's waveform portion extends into a waveform portion for a word having a high confidence measure with respect to its waveform portion, then the particular word may be considered misaligned. For example, consider a three word transcription "van buuren music." Also assume that the words "van" and "music" are assigned high confidence measures with respect to their respective portions of a waveform used to generate the three word transcription. If the portion of the waveform used to generate the word "buuren" extends into the portion of the waveform used to generate the word "van" and/or the word "music," the word "buuren" may be considered misaligned and thus the transcription may be considered misaligned.

The measure of frame alignment may be based on the confidence measures assigned to each word that another word's waveform portion extends into and/or the amount in which the waveform extends into each word. For example, a waveform portion that extends further into another word's waveform portion may be considered more misaligned than a waveform portion that does not extend as far into another word's waveform portion. By way of another example, a first word's misalignment may be directly proportional to the confidence measure for a second word having a waveform portion in which the first word's waveform portion extends.

A measure of frame alignment can be determined for the transcription T1 and/or the transcription T2. The measure(s) can be included in the set of feature scores for the pair of transcriptions T1 and T2 and/or, data indicating which transcription T1 or T2 is more correctly aligned based on the measures of frame alignment can be included in the set of feature scores.

The feature scorer 150 can also determine a speech recognizer confidence measure for each transcription of the pair of transcriptions T1 and T2. The confidence measure for a particular transcription can indicate a level of confidence that the particular transcription of the utterance is correct. The confidence score(s) and/or a difference between the confidence scores can be included in the set of feature scores for the pair of transcriptions T1 and T2.

The feature scorer 150 can also determine an edit distance between the two transcriptions T1 and T2. For example, the feature scorer 150 may determine a phonetic edit distance between a sequence of phonemes that represents the first transcription T1 and a sequence of phonemes that represents the second transcription T2. To determine the phonetic edit distance for the pair of transcriptions T1 and T2, the feature scorer 150 may obtain a first sequence of phonemes that represents the first transcription T1 and a second sequence of phonemes that represents the second transcription T2. The feature scorer 150 may then determine a number of phonemes in the second sequence that are different from the phonemes in the first sequence (e.g., a number of phonemes from T2 that would need to change in order to match T1). The edit distance can be included in the set of feature scores for the pair of transcriptions T1 and T2.

The feature scorer 150 can also determine whether the mapping that resulted in the selection of a word for the second transcription T2 that differed from a word of the first transcription collides with another mapping. For example, the mapping associated with mapping ID 1728 maps the phonetic sequence "b y uh r ih n" with the word "buuren." If another mapping includes the same phonetic sequence for a word that is different from "buuren," then the two mappings may be considered to be colliding. By way of another example, if another mapping for the word "buuren" includes a phonetic sequence that differs from the phonetic sequence of mapping ID 1728, the two mappings may be considered to be colliding. A value indicating whether or not the mapping collides with another mapping may be included in the set of features. An edit distance between the two words of the colliding mappings may also be included in the set of features for the pair of transcriptions T1 and T2.

The feature scorer 150 may also determine the length of the word of the second transcription T2 that is different from a corresponding word of the first transcription T1. For example, a proposed mapping that causes a change in a short word, e.g., changing the word "van" in the transcription T1 to "can" may be more likely to cause inaccuracies in speech recognition than mappings of longer words. In the "van buuren" example, the length of the differing word may be the length of the word "buuren," e.g., six characters. If more than one word differs between the two transcriptions, the length of the shortest word of the second transcription can be used as the word length. The word length may be included in the set of features for the pair of transcriptions T1 and T2.

The feature scorer 150 can also determine the position of the differing phones (i.e., phones of the second transcription that differ from phones of the first transcription) within a word or within the sequence of phones for the second transcription T2. For example, the feature scorer 150 can determine whether the differing phone is the initial phone of a word or sequence, and internal phone (e.g., phone within a word or sequence), or the final phone of the word or sequence. This position data can also be included in the set of features for the pair of transcriptions T1 and T2. The use of this feature may help with phone boundary errors.

The feature scorer 150 can also determine a phoneme sequence language model score for each transcription T1 and T2. The phoneme sequence language model score for a particular transcription may indicate the likelihood that the phoneme sequence for the particular transcription would be found in a particular language. The phoneme sequence language model score for one or both transcriptions T1 and T2 and/or a difference between the phoneme sequence language model scores can be included in the set of features for the pair of transcriptions T1 and T2.

The feature scorer 150 can also determine whether the first transcription T1 and/or the second transcription T2 have been used in a query correction service to correct a misspelled query. In some implementations, the feature scorer 150 sends the first transcription T1 to a query correction service and receives an output (e.g., a revised version of the transcription) from the query correction service. The feature scorer 150 can then compare the output to the second transcription T2 to determine whether the output matches the second transcription T2, and indicate whether the output matches T2 in a feature score. If the output matches the second transcription T2 (e.g., the query correction service rewrote the transcription T1 as the transcription T2), this may indicate that the transcription T2 is more likely to be correct than the transcription T1. Data indicating whether each transcription has been used to correct a query can be included in the set of features for the pair of transcriptions T1 and T2.

The feature scorer 150 can also determine whether the first transcription T1 and/or the second transcription T2 have been used as a suggested query in a query suggestion service. Data indicating whether each transcription has been used as a suggestion can be included in the set of features for the pair of transcriptions T1 and T2. In some implementations, the feature scorer 150 sends the first transcription T1 to a query suggestion service and receives, from the query suggestion system, one or more query suggestions that are generated based on the first transcription T1. The feature scorer 150 can then determine whether a query suggestion generated based on the first transcription matches the second transcription T2, and indicate whether a match has been found in a feature score.

In some implementations, the feature scorer 150 may interact with the query suggestion service to determine whether the second transcription T2 has been selected (e.g., by a user) in response to being presented as a query suggestion for a query that matches the first transcription T1. For example, the feature scorer 150 may send the transcriptions T1 and T2 to the query suggestion service with a request for data (e.g., from user interaction logs) indicating whether the second transcription T2 has been selected, or how often the second transcription T2 has been selected, in response to being presented as a query suggestion for a query that matches the first transcription T1.

The feature scorer 150 can also determine a measure of the relative frequency that users have spoken or typed one or more portions of the first transcription T1 or one or more portions of the second transcription T2. For example, the feature scorer 150 may determine the frequency at which the differing word (e.g., the word "buuren") has been spoken (or a number of spoken occurences of the differing word) using a log of audio data. The feature scorer 150 may also determine the frequency at which the differing word has been typed (or a number of typed occurences of the differing word) using a log of typed data. The feature scorer 150 can then compute a ratio between the two frequencies (or numbers of occurences) and include the ratio in the set of feature scores for the pair of transcriptions T1 and T2. For pairs of transcriptions in which two or more words are different between the two transcriptions, a similar ratio can be computed for each n-gram (e.g., unigram, bigram, etc.) of the differing words.

The feature scorer 150 can also determine the ratio of the number of occurrences of the differing word and its corresponding word in the first transcription T1. For example, as a 1-gram score, the feature scorer 150 may determine the ratio between the typed (or audio) frequency for the word "buren" and the typed (or audio) frequency for the word "buuren." The feature scorer 150 can also determine similar ratios between other n-grams of the second transcription T2 that include the differing word and corresponding n-grams of the first transcription T1. For example, for a bigram score, the features scorer 150 can determine the ratio between the frequency of occurrence for the bigram "buuren music" and the frequency of occurrence for the bigram "buren music." Similarly, the feature scorer 150 can determine another bigram score as the ratio between the frequency of occurrence of the bigram "van buuren" and the frequency of occurrence of the bigram "van buren." These ratios can be included in the set of feature scores.

The feature scorer 150 can determine, for each transcription T1 and T2, a ratio between the number of spoken occurrences of an n-gram that include the differing word and the number of typed occurrences of the n-gram that includes the differing word. Continuing the previous example, a ratio between the number of spoken occurrences of the bigram "buren music" and the number of typed occurrences of the bigram "buren music" can be determined for the transcription T1. Similarly, a ratio between the number of spoken occurrences of the bigram "buuren music" and the number of typed occurrences of the bigram "buuren music" can be determined for the transcription T2. These feature scores can indicate whether, or to what degree, the spoken/typed ratio for an n-gram of the transcription T2 is changed relative to the spoken/typed ratio for the corresponding n-gram of the transcription T1. For example, a feature score may indicate whether the spoken/typed ratio for the n-gram for the transcription T2 has a value closer to one than the spoken/typed ratio for the corresponding n-gram from the transcription T1. These ratios can also be included in the set of feature scores for the transcriptions T1 and T2.

The feature scorer 150 may also determine a score that indicates the similarity between the sequence of phones for the second transcription T2 and the sequence of phones for the first transcription T1.

The feature scorer 150 can provide the feature scores for the pair of transcriptions T1 and T2 to a transcription classifier 160. The transcription classifier 160 can determine a classifier output for the transcription pair, for example, based on the feature scores received from the feature scorer 150. In the example of FIG. 1, the classifier output can indicate whether the transcription T2 is more likely to be correct than the transcription T1 for the utterance 105.

In some implementations, the transcription classifier 160 includes a machine learning framework. The transcription classifier 160 may use maximum entropy, boost decision tree, and/or support vector machine classifiers to determine the classifier output for a pair of transcriptions for an utterance. The transcription classifier 160 can associate the classifier output with the mapping ID identified by the mapping identifier 140 (e.g., the mapping ID for the mapping used to select the word of transcription T2 that differs from a corresponding word of transcription T1). For example, the transcription classifier 160 may associate the classifier output for the pair of transcriptions T1 and T2 with the mapping ID 1728. The transcription classifier 160 can provide the classifier output and its associated mapping ID to a mapping scorer 170. An example of a mapping scorer 170 is discussed below with respect to FIG. 2.

The pronunciation verification system 110 can evaluate multiple utterances and determine classifier outputs for each utterance in which the speech engines 112 and 114 generate transcriptions that do not match. For example, the pronunciation verification system 110 may evaluate hundreds, thousands, or millions of utterances. The mapping scorer 170 can use the classifier outputs associated with each mapping ID to determine a score for the mapping ID and its corresponding mapping. For example, the mapping having mapping ID 1728 may have multiple associated classifier outputs due to the mapping resulting in differences between pairs of transcriptions for multiple utterances. The transcription classifier 160 may determine a classifier output for each of the multiple utterances (e.g., using feature scores for the utterance's transcription pair). The mapping scorer 170 can aggregate these classifier outputs for mapping ID 1728 and determine a score for the mapping based on the classifier outputs.

Some mappings represent pronunciations that are used infrequently in speech. Therefore, the pronunciation verification system 110 may evaluate many utterances in order to identify utterances that are examples of the uncommon pronunciation and result in a different transcription than a baseline mapping. In some implementations, filtering techniques may be used to reduce the number of utterances evaluated by the pronunciation verification system 110 for a particular mapping. For example, utterances that are irrelevant to the particular mapping may be filtered from use in evaluating the particular mapping.

One example filtering technique is to index the mappings and/or the utterances. For example, utterances may be transcribed to sequences of phones. The pronunciation verification system 110 can then index the utterances according to the phones in the transcriptions. For example, for each phone in a language, data can be stored that associates the phone with the utterance identifiers for the utterances whose transcriptions that include the phone. The pronunciation verification system 110 can use the data to identify the set of utterances that contain a particular phone or a particular combination of phones.

In some implementations, the phone sequence of the utterance are compared to the phoneme sequences of the mappings to identify each mapping that includes a phoneme sequence that matches at least a portion of the phoneme sequence of the utterance. Data can be stored in an index that associates, with each mapping, each utterance that includes a phone sequence that matches at least a portion of the phoneme sequence of the mapping. Before a particular mapping is evaluated, the pronunciation verification system 110 can identify utterances (e.g., a subset of one or more utterances from the utterance repository 101) that are associated with the particular mapping for use in evaluating the particular mapping. These utterances can then be evaluated by the pronunciation verification system 110, as described herein.

Another example filtering technique includes transcribing utterances to phone sequences and comparing the phone sequence of each utterance to the phoneme sequence of a particular mapping of interest. To evaluate a particular mapping, the pronunciation verification system 110 can perform text matching between the phoneme sequence of a particular mapping and the phone sequences in the transcriptions of the utterances. If the transcription of an utterance includes a sufficient number of phones that match phonemes in the phoneme sequence of the mapping (e.g., the transcription of the utterance includes at least a threshold portion of the phoneme sequence of the mapping), the utterance may be used to evaluate the mapping. This filtering technique may be used at run time to filter utterances that do not include a sufficient number of phonemes in common with the mapping. Using the filtering technique(s), the pronunciation verification system 110 can more quickly identify utterances for each mapping.

The transcription classifier 160 can be trained using two speech engines, such as speech engines 112 and 114. Each speech engine can transcribe an utterance and the transcriptions can be labeled (e.g., by people) based on which transcription is better (e.g., most accurate). For example, a person may review a first transcription T1 and a second transcription T2 for a particular utterance and label one of the transcriptions as being better than the other transcription. Or, the person may label each transcription individually as being unusable, usable, exact, or nonsense.

Feature scores, such as the feature scores discussed above, can be computed for each transcription. These feature scores can be provided as inputs to the transcription classifier 160, and the labels for the transcriptions can be used as training targets for the transcription classifier 160. The transcription classifier 160 can be updated using the feature scores and the labels for the transcriptions of each utterance. Training of the transcription classifier 160 can continue for multiple utterances until the transcription classifier 160 performs with a desired level of performance (e.g., a desired level of accuracy or precision).

Figure 2:
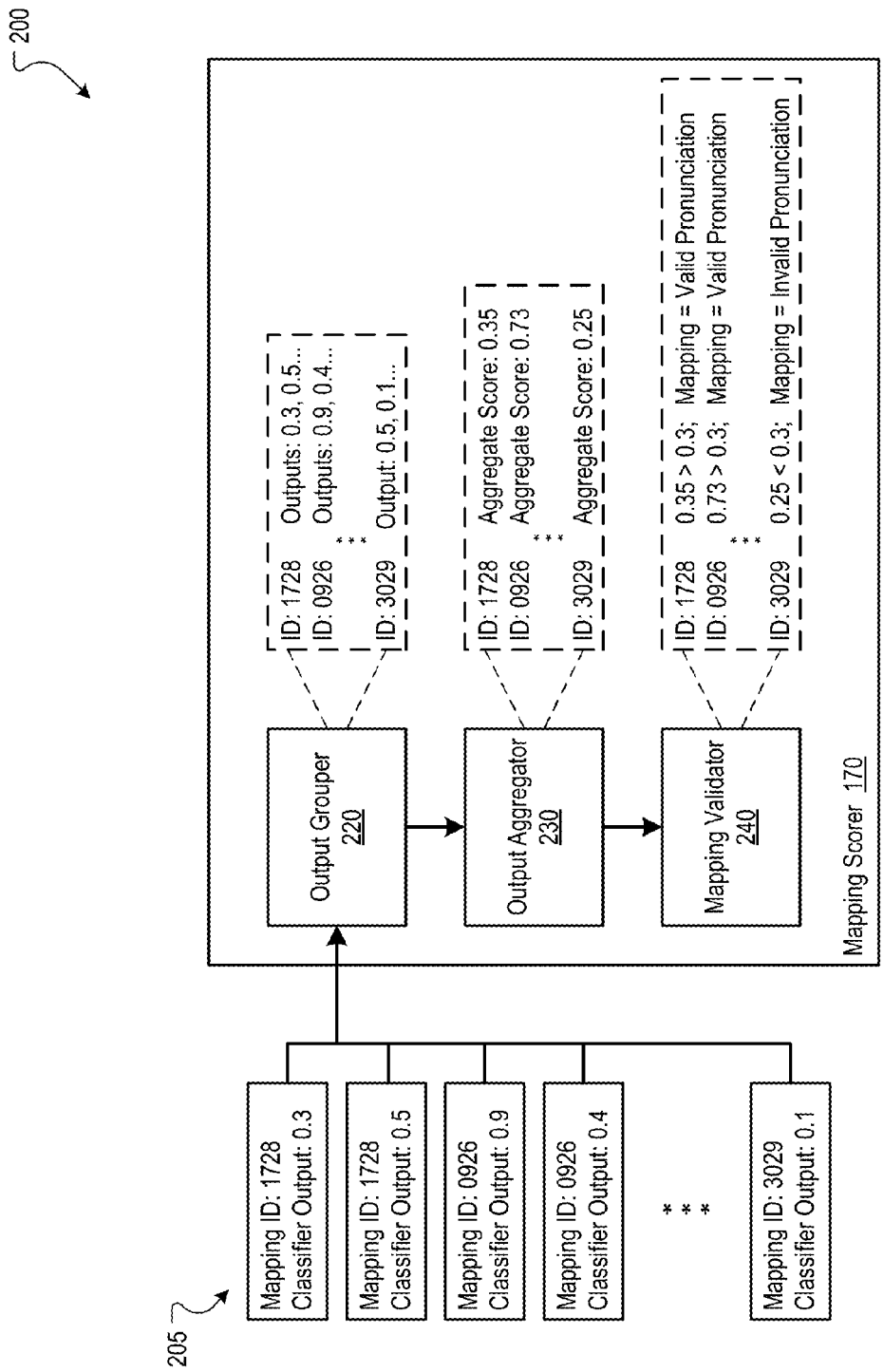
FIG. 2 is a diagram of an example mapping scorer.

FIG. 2 is a diagram of an example mapping scorer. FIG. 2 shows an example environment 200 in which mapping scorer 170 determines scores for mappings between phoneme sequences and words. The example mapping scorer 170 can receive multiple classifier outputs 205, for example, from a transcription classifier 160. Each classifier output 205 can be associated with one or more mapping IDs from the set of mappings 115. Each classifier output 205 corresponds to a different utterance and associated pair of transcriptions.

The mapping scorer 170 includes an output grouper 220 that aggregates classifier outputs for each mapping ID. The output grouper 220 can identify, from the classifier outputs 205, each classifier output that is associated with a particular mapping ID and aggregate the identified classifier outputs. For example, the output grouper 220 has identified, among others, classifier outputs of "0.3" and "0.5" for mapping ID 1378. Similarly, the output grouper 220 has identified, among others, classifier outputs of "0.9" and "0.4" for mapping ID 0926. If a classifier output 205 has multiple mapping IDs associated with it, the classifier output 205 can be included in groups for each of the multiple mapping IDs.

The output grouper 220 can provide, for each mapping ID, the classifier outputs associated with the mapping ID to an output aggregator 230. The output aggregator 230 can determine an aggregate score for each mapping ID based on the classifier outputs associated with the mapping ID. In some implementations, the aggregate score for a mapping ID may be the average, mean, median, or other measure of central tendency of the classifier outputs associated with the mapping ID. In some implementations, the aggregate score may be proportional to the average, mean, median, or other measure of central tendency of the classifier outputs associated with the mapping ID.

The output grouper 230 can provide the aggregate score for each mapping ID to mapping validator 240. The mapping validator 240 can determine whether to validate the mapping associated with each mapping ID based on the aggregate score for the mapping ID. In some implementations, the mapping validator 240 compares the aggregate score for a mapping ID to a threshold score to determine whether to validate the mapping for the mapping ID. If the aggregate score for a mapping ID satisfies the threshold score (e.g., by meeting or exceeding the threshold score), the mapping validator 240 may classify the mapping associated with the mapping ID as a valid mapping. The valid mappings may then be used to transcribe utterances, e.g., utterances received from a user.

Figure 3:
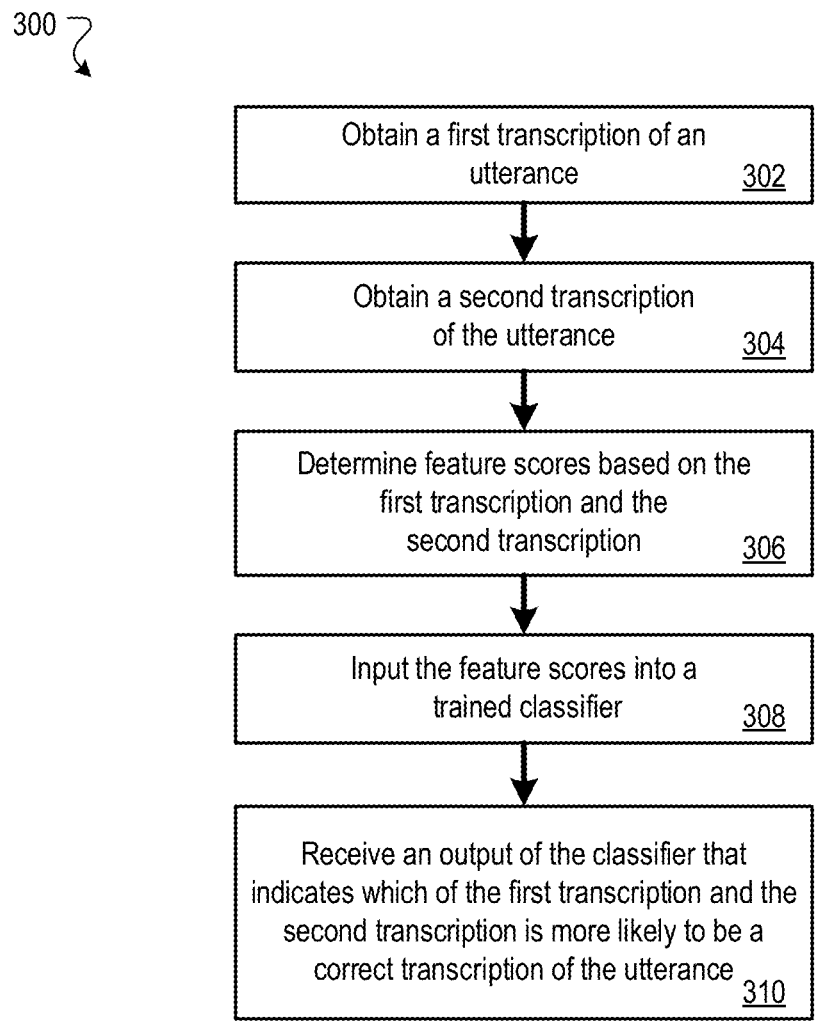
FIG. 3 is a flow chart of an example process for determining which of two transcriptions of an utterance is more likely to be correct.

FIG. 3 is a flow chart of an example process 300 for determining which of two transcriptions of an utterance is more likely to be correct. Operations of the process 300 can be implemented, for example, by a data processing apparatus, such as the pronunciation verification system 110 of FIG. 1. The process 300 can also be implemented by instructions stored on computer storage medium, where execution of the instructions by a data processing apparatus cause the data processing apparatus to perform the operations of the process 300.

At block 302, a first transcription of an utterance is obtained. For example, the first transcription of the utterance may be obtained from a speech engine, e.g., the speech engine 112 of FIG. 1. The speech engine 112 may receive the utterance, e.g., from a user, and generate a transcription of the utterance using the set of mappings 113. To transcribe the utterance, the speech engine 112 can convert the utterance into a sequence of phonemes. The speech engine 112 can then use the set of mappings 113 to convert the sequence of phonemes to the first transcription, which includes one or more words.

At block 304, a second transcription of the utterance is obtained. For example, the second transcription of the utterance may be obtained from a second speech engine, e.g., the speech engine 114 of FIG. 1. The speech engine 114 may receive the utterance and generate a transcription of the utterance using the set of mappings 115, which may be different from the set of mappings 113. To transcribe the utterance, the speech engine 114 can convert the utterance into a sequence of phonemes. The speech engine 114 can then use the set of mappings 115 to convert the sequence of phonemes to the second transcription, which includes one or more words.

At block 306, feature scores are determined based on the first transcription and the second transcription. For example, the feature scorer 150 of FIG. 1 may receive the first and second transcriptions from the speech engines 112 and 114 in response to a determination that the transcriptions differ, e.g., as determined by the feature comparer 130 of FIG. 1. The feature scorer 150 can determine one or more feature scores based on characteristics or features of the transcriptions. As described above, these feature scores may include one or more language model scores; one or more acoustic model scores; one or more speech recognizer confidence measures; an edit distance between the two transcriptions; one or more phoneme sequence language model scores; and/or one or more frame alignment scores for the two transcriptions. The feature scorer 150 can also determine whether the mapping that resulted in the selected of a word for the second transcription that differs from a word of the first transcription collides with another mapping; the length of the word of the second transcription that is different from a corresponding word of the first transcription; the position of phones of the second transcription that differ from phones of the first transcription; whether the first transcription and/or the second transcription have been used by a query correction service to correct a misspelled query; whether the first transcription and/or the second transcription have been used as a query suggestion by a query suggestion service; whether the second transcription has been selected in response to being presented as a query suggestion for a query that matches the first transcription; a measure of the relative frequency that users have spoken or typed one or more portions of the first transcription or one or more portions of the second transcription; and/or the ratio of the number of occurrences of the differing word of the second transcription and its corresponding word of the first transcription.

At block 308, the feature scores are provided as input to a trained classifier. For example, one or more of the feature scores determined by the feature scorer 150 can be provided as an input to the transcription classifier 160 of FIG. 1.

At block 310, an output is received from the trained classifier. For example, the transcription classifier 160 determine, using the feature scores received from the feature scorer 150, which of the first transcription and the second transcription is more likely to be a correct transcription of the utterance. The transcription classifier 160 can provide the output to a mapping scorer, e.g., the mapping scorer 170 of FIG. 1, or to another component or system.

Figure 4:
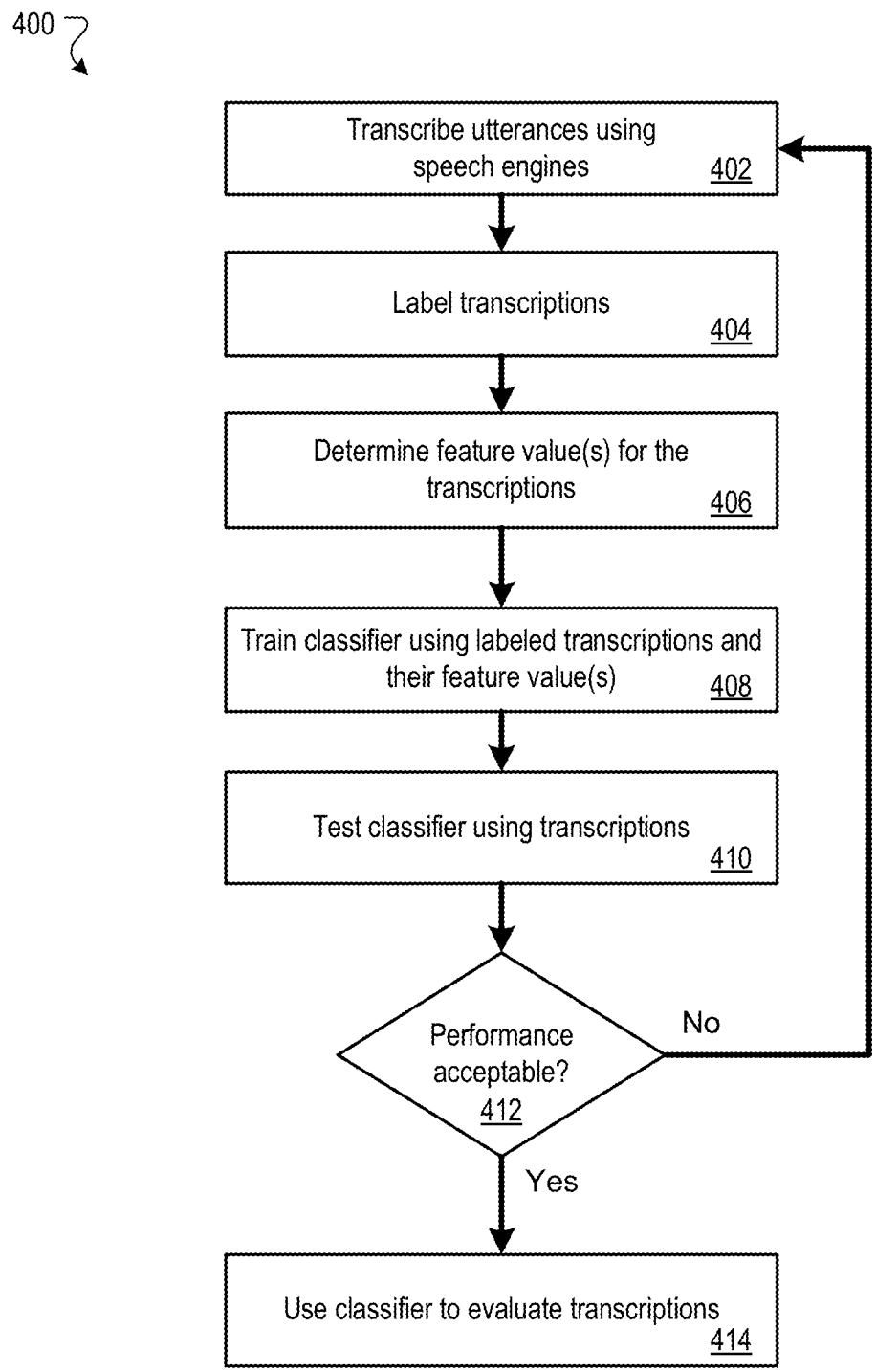
FIG. 4 is a flow chart of an example process for training a classifier.

FIG. 4 is a flow chart of an example process 400 for training a classifier. Operations of the process 400 can be implemented, for example, by a data processing apparatus, such as the pronunciation verification system 110 of FIG. 1. The process 400 can also be implemented by instructions stored on computer storage medium, where execution of the instructions by a data processing apparatus cause the data processing apparatus to perform the operations of the process 400.

At block 402, one or more utterances are transcribed by speech engines. For example, a set of training utterances may be transcribed by two speech engines, e.g., the speech engines 112 and 114.

At block 404, the transcriptions are labeled. For example, one or more persons may label each transcription based on how well the transcription matches its corresponding utterance. For example, a person may label each transcription individually as being unusable, usable, exact, nonsense, or some other appropriate label. If two speech engines are used, each a person may review a first transcription and a second transcription for a particular utterance and label one of the transcriptions as being better than the other transcription.

At block 406 feature values of each transcription (or each pair of transcriptions) are determined. For example, that classifier may be trained to determine which of two or more transcriptions are better based on a particular set of feature values for transcriptions. Each feature value of the set of feature values can be determined for each transcription or each pair of transcriptions generated using the set of training utterances.

At block 408, the classifier is trained using the labeled transcriptions and their corresponding feature values. The classifier may be adapted to determine which of two or more transcriptions are more likely to be correct based on the feature values of input transcriptions. Training the classifier may include adjusting weights associated with features and feature combinations. Various methods and techniques for correlating the features and transcriptions that are more likely to be correct may be used. For example, the classifier may be trained as a maximum entropy classifier, a boost decision tree classifier, or a support vector machine classifier.

At block 410, a determination is made whether the performance of the classifier is acceptable. For example, the classifier may be used to determine, for multiple pairs of transcriptions, which transcription is more likely to be correct. The output of the classifier may be reviewed, for example, by one or more persons. The classifier may be deemed to have acceptable performance if at least a threshold percent of the outputs are deemed to be correct by the reviewers.

If the performance of the classifier is not acceptable, additional training utterances may be used to train the classifier. If the performance of the classifier is acceptable, the classifier can be used to evaluate transcriptions of utterances. For example, the classifier may be used to determine which of multiple transcriptions for an utterance is more likely to be correct.

Figure 5:
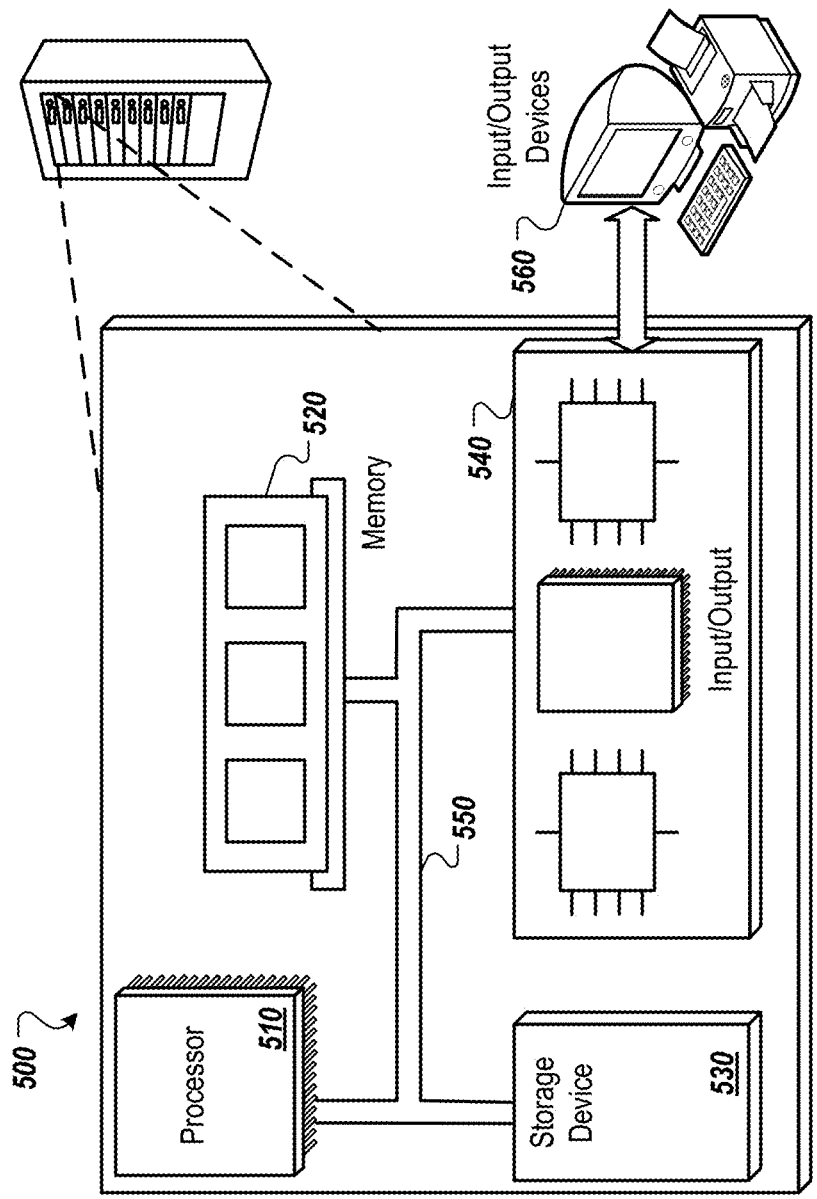
FIG. 5 is a block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 320 or on the storage device 330.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, storage device 330 is a computer-readable medium. In various different implementations, the storage device 330 can include, for example, a hard disk device, an optical disk device, a storage device that is shared over a network by multiple computing devices (e.g., a cloud storage device), or some other large capacity storage device.

The input/output device 340 provides input/output operations for the system 500. In one implementation, the input/output device 340 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 360. Other implementations, however, can also be used, such as mobile computing devices, mobile communication devices, set-top box television client devices, etc.

Although an example processing system has been described in FIG. 3, implementations of the subject matter and the functional operations described in this specification can be implemented in other types of digital electronic circuitry, or in computer software, firmware, or hardware, including the structures disclosed in this specification and their structural equivalents, or in combinations of one or more of them.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more computers of an automated speech recognition system, the method comprising:

obtaining, by the one or more computers of the automated speech recognition system and using a first set of multiple mappings between phoneme sequences and words, a first word-level transcription for a particular utterance spoken by a particular speaker, the first word-level transcription including a first set of one or more words;

obtaining, by the one or more computers of the automated speech recognition system and using a second set of multiple mappings between phoneme sequences and words, a second word-level transcription for the particular utterance spoken by the particular speaker, wherein the first word-level transcription and the second word-level transcription are transcriptions of the same particular utterance spoken by the same particular speaker, and wherein the second word-level transcription includes a second set of one or more words that is different from the first set of one or more words, and wherein the second set of multiple mappings is different from the first set of multiple mappings;

determining, by the one or more computers of the automated speech recognition system, that the second set of one or more words of the second word-level transcription includes a word that is different from the first set of one or more words of the first word-level transcription and in response to the determination:

determining, by the one or more computers of the automated speech recognition system, feature scores based on the first transcription and the second transcription, wherein the feature scores include (i) a first measure of frame alignment between the first word-level transcription and an audio waveform of the particular utterance, (ii) a second measure of frame alignment between the second word-level transcription and the particular utterance, and (iii) data indicating a difference between a length of the first word-level transcription and a length of the second word-level transcription; and inputting, by the one or more computers of the automated speech recognition system, the feature scores to a trained classifier;

receiving, by the one or more computers of the automated speech recognition system, an output of the trained classifier that indicates which of the first word-level transcription and the second word-level transcription is more likely to be a correct transcription of the particular utterance;

identifying, by the one or more computers of the automated speech recognition system, a mapping in the second set of multiple mappings that causes the second set of one or more words to be different from the first set of one or more words;

obtaining, by the one or more computers of the automated speech recognition system, classifier outputs for each of multiple transcription pairs, wherein each of the multiple transcription pairs comprises two different transcriptions, and the identified mapping from the set of mappings causes a difference between the two different transcriptions of each transcription pair;

aggregating, by the one or more computers of the automated speech recognition system, the classifier outputs to generate an aggregate score;

comparing, by the one or more computers of the automated speech recognition system, the aggregate score to a threshold;

based on comparing the aggregate score to the threshold, determining, by the one or more computers of the automated speech recognition system, that the identified mapping likely represents a valid pronunciation; and in response to determining that the identified mapping likely represents a valid pronunciation, providing, by the one or more computers of the automated speech recognition system and as an output of the automated speech recognition system, a transcription determined using the identified mapping.

2. A method performed by one or more computers of an automated speech recognition system, the method comprising:

using, by the one or more computers of the automated speech recognition system, a first set of multiple mappings between phoneme sequences and words to determine a first word-level transcription for a particular utterance spoken by a particular speaker, the first word-level transcription including a first set of one or more words;

using, by the one or more computers of the automated speech recognition system, a second set of multiple mappings between phoneme sequences and words to determine a second word-level transcription for the particular utterance spoken by the particular speaker, wherein the first word-level transcription and the second word-level transcription are transcriptions of the same particular utterance spoken by the same particular speaker, wherein the second word-level transcription includes a second set of one or more words that is different from the first set of one or more words, and wherein the second set of multiple mappings is different from the first set of multiple mappings;

determining, by the one or more computers of the automated speech recognition system, that the second set of one or more words of the second word-level transcription includes a word that is different from the first set of one or more words of the first word-level transcription and in response to the determination:

identifying, by the one or more computers of the automated speech recognition system, a mapping in the second set of multiple mappings that causes the second set of one or more words of the second word-level transcription to be different from the first set of one or more words of the first word-level transcription;

determining, by the one or more computers of the automated speech recognition system, feature scores based on the first word-level transcription and the second word-level transcription, wherein the feature scores include (i) a first measure of frame alignment between the first word-level transcription and an audio waveform of the particular utterance, (ii) a second measure of frame alignment between the second word-level transcription and the particular utterance, and (iii) data indicating a difference between a length of the first word-level transcription and a length of the second word-level transcription; and providing the feature scores to a classifier;

receiving, by the one or more computers of the automated speech recognition system, an output of the classifier generated using the feature scores, the output of the classifier indicating that the first word-level transcription is more likely to be a correct transcription of the particular utterance spoken by the particular speaker than the second word-level transcription; and in response to receiving the output, providing, by the one or more computers of the automated speech recognition system and as an output of the automated speech recognition system, a transcription determined (i) using the first set of multiple mappings between phoneme sequences and words and (ii) not using the second set of multiple mappings between phoneme sequences and words.

3. The method of claim 2, wherein differences between the first set of one or more words and the second set of one or more words are entirely due to differences between the first set of multiple mappings and the second set of multiple mappings.

4. The method of claim 2, wherein identifying the mapping comprises:

determining an alignment of the second word-level transcription with respect to the first word-level transcription;

based on the alignment, identifying a word in the second word-level transcription that is different from a corresponding word in the first word-level transcription; and identifying, from the second set of multiple mappings, a mapping that was used to select the word in the second word-level transcription that is different from the corresponding word in the first word-level transcription.

5. The method of claim 2, further comprising:

obtaining classifier outputs for each of multiple transcription pairs, wherein each of the multiple transcription pairs comprises two different transcriptions, and the identified mapping from the second set multiple mappings causes a difference between the two different transcriptions of each transcription pair;

aggregating the classifier outputs to generate an aggregate score;

comparing the aggregate score to a threshold; and based on comparing the aggregate score to the threshold, determining whether the identified mapping likely represents a valid pronunciation.

6. The method of claim 2, further comprising:

identifying a particular mapping between a phoneme sequence and one or more words; and identifying, in a set of utterances, a subset comprising one or more utterances that each include a phone sequence that matches at least a portion of the phoneme sequence of the particular mapping, wherein the particular utterance is a member of the subset.

7. The method of claim 2, wherein determining feature scores based on the first word-level transcription and the second word-level transcription comprises determining a language model score for at least one of the first word-level transcription and the second word-level transcription.

8. The method of claim 2, wherein determining feature scores based on the first word-level transcription and the second word-level transcription comprises:
obtaining a first sequence of phones that represents the first word-level transcription;
obtaining a second sequence of phones that represents the second word-level transcription; and
identifying, as a phonetic edit distance, a number of phones in the second sequence of phones that are different from the first sequence of phones.

9. The method of claim 2, wherein determining feature scores based on the first word-level transcription and the second word-level transcription comprises obtaining data specifying whether the second word-level transcription has been provided as a suggested query in response to receiving a query that matches the first word-level transcription.

10. The method of claim 2, wherein determining feature scores based on the first word-level transcription and the second word-level transcription comprises determining an acoustic model score for at least one of the first word-level transcription and the second word-level transcription, the acoustic model score for a transcription specifying a level of match between an audio waveform that represents the transcription and an audio waveform that represents the particular utterance.

11. The method of claim 2, wherein determining feature scores based on the first word-level transcription and the second word-level transcription comprises:
identifying a second mapping between a phoneme sequence and words that resulted in a selection of a word in the second word-level transcription that is different from a word in the first word-level transcription; and
determining whether the phoneme sequence of the identified second mapping matches a phoneme sequence for a third mapping that maps the phoneme sequence to a second word that is different from the word in the second word-level transcription.

12. The method of claim 2, further comprising determining whether the identified mapping likely represents a valid pronunciation based at least in part on the output of the classifier.

13. The method of claim 12, further comprising using the identified mapping in the automated speech recognition system in response to determining that the mapping likely represents a valid pronunciation.

14. The method of claim 13, wherein using the identified mapping in the automated speech recognition system comprises using the identified mapping to transcribe utterances received from multiple users.

15. The method of claim 12, further comprising removing the identified mapping from the automated speech recognition system in response to determining that the mapping does not likely represent a valid pronunciation.

16. The method of claim 2, further comprising identifying, for the utterance, a phoneme sequence that represents the particular utterance, wherein the phoneme sequence represents a first word in the first set of multiple mappings and second word different from the first word in the second set of multiple mappings.

17. The method of claim 2, wherein the first set of one or more words includes a particular word and the second set of one or more words includes a corresponding word that is different from the particular word.

18. An automated speech recognition system, comprising:
a data processing apparatus; and
a memory storage apparatus in data communication with the data processing apparatus, the memory storage apparatus storing instructions executable by the data processing apparatus and that upon such execution cause the data processing apparatus to perform operations comprising:
using, by the data processing apparatus, a first set of multiple mappings between phoneme sequences and words to determine a first word-level transcription for a particular utterance of a particular speaker, the first word-level transcription including a first set of one or more words;
using, by the data processing apparatus, a second set of multiple mappings between phoneme sequences and words to determine a second word-level transcription for the particular utterance of the particular speaker, wherein the first word-level transcription and the second word-level transcription are transcriptions of the same particular utterance spoken by the same particular speaker, wherein the second word-level transcription includes a second set of one or more words that is different from the first set of one or more words, and wherein the second set of multiple mappings is different from the first set of multiple mappings;
determining, by the data processing apparatus, that the second set of one or more words of the second word-level transcription includes a word that is different from the first set of one or more words of the first word-level transcription and in response to the determination:
identifying, by the data processing apparatus, a mapping in the second set of multiple mappings that causes the second set of one or more words of the second word-level transcription to be different from the first set of one or more words of the first word-level transcription;
determining, by the data processing apparatus, feature scores based on the first word-level transcription and the second word-level transcription, wherein the feature scores include (i) a first measure of frame alignment between the first word-level transcription and an audio waveform of the particular utterance, (ii) a second measure of frame alignment between the second word-level transcription and the particular utterance, and (iii) data indicating a difference between a length of the first word-level transcription and a length of the second word-level transcription; and
providing, by the data processing apparatus, the feature scores to a classifier;
receiving, by the data processing apparatus, an output of the classifier generated using the feature scores, the output of the classifier indicating that the first word-level transcription is more likely to be a correct transcription of the particular utterance spoken by the particular speaker than the second word-level transcription; and
in response to receiving the output, providing, by the data processing apparatus and as an output of the automated speech recognition system, a transcription determined (i) using the first set of multiple mappings between phoneme sequences and words and (ii) not using the second set of multiple mappings between phoneme sequences and words.

19. The system of claim 18, wherein differences between the first set of one or more words and the second set of one or more words are entirely due to differences between the first set of multiple mappings and the second set of multiple mappings.

20. The system of claim 18, wherein identifying the mapping comprises:
   determining an alignment of the second word-level transcription with respect to the first word-level transcription;
   based on the alignment, identifying a word in the second word-level transcription that is different from a corresponding word in the first word-level transcription; and
   identifying, from the second set of multiple mappings, a mapping that was used to select the word in the second word-level transcription that is different from the corresponding word in the first word-level transcription.

21. The system of claim 18, wherein the operations further comprise:
   obtaining classifier outputs for each of multiple transcription pairs, wherein each of the multiple transcription pairs comprises two different transcriptions, and the identified mapping from the second set of multiple mappings causes a difference between the two different transcriptions of each transcription pair;
   aggregating the classifier outputs to generate an aggregate score;
   comparing the aggregate score to a threshold; and
   based on comparing the aggregate score to the threshold, determining whether the identified mapping likely represents a valid pronunciation.

22. A non-transitory computer-readable storage medium encoded with a computer program, the program comprising instructions that, when executed by a data processing apparatus of an automated speech recognition system, cause the data processing apparatus to perform operations comprising:
   using, by the data processing apparatus of the automated speech recognition system, a first set of multiple mappings between phoneme sequences and words to determine a first word-level transcription for a particular utterance spoken by a particular speaker, the first word-level transcription including a first set of one or more words;
   using, by the data processing apparatus of the automated speech recognition system, a second set of multiple mappings between phoneme sequences and words to determine a second word-level transcription for the particular utterance spoken by the particular speaker, wherein the first word-level transcription and the second word-level transcription are transcriptions of the same particular utterance spoken by the same particular speaker, wherein the second word-level transcription includes a second set of one or more words that is different from the first set of one or more words, and wherein the second set of multiple mappings is different from the first set of multiple mappings;
   determining, by the data processing apparatus, that the second set of one or more words of the second word-level transcription includes a word that is different from the first set of one or more words of the first word-level transcription and in response to the determination:
      identifying, by the data processing apparatus of the automated speech recognition system, a mapping in the second set of multiple mappings that causes the second set of one or more words of the second word-level transcription to be different from the first set of one or more words of the first word-level transcription;
      determining, by the data processing apparatus of the automated speech recognition system, feature scores based on the first word-level transcription and the second word-level transcription, wherein the feature scores include (i) a first measure of frame alignment between the first word-level transcription and an audio waveform of the particular utterance, (ii) a second measure of frame alignment between the second word-level transcription and the particular utterance, and (iii) data indicating a difference between a length of the first word-level transcription and a length of the second word-level transcription; and
      providing, by the data processing apparatus, the feature scores to a classifier;
   receiving, by the data processing apparatus of the automated speech recognition system, an output of the classifier generated using the feature scores, the output of the classifier indicating that the first word-level transcription is more likely to be a correct transcription of the particular utterance spoken by the particular speaker than the second word-level transcription; and
   in response to receiving the output, providing, by the data processing apparatus of the automated speech recognition system and as an output of the automated speech recognition system, a transcription determined (i) using the first set of multiple mappings between phoneme sequences and words and (ii) not using the second set of multiple mappings between phoneme sequences and words.

* * * * *